Figure 1:
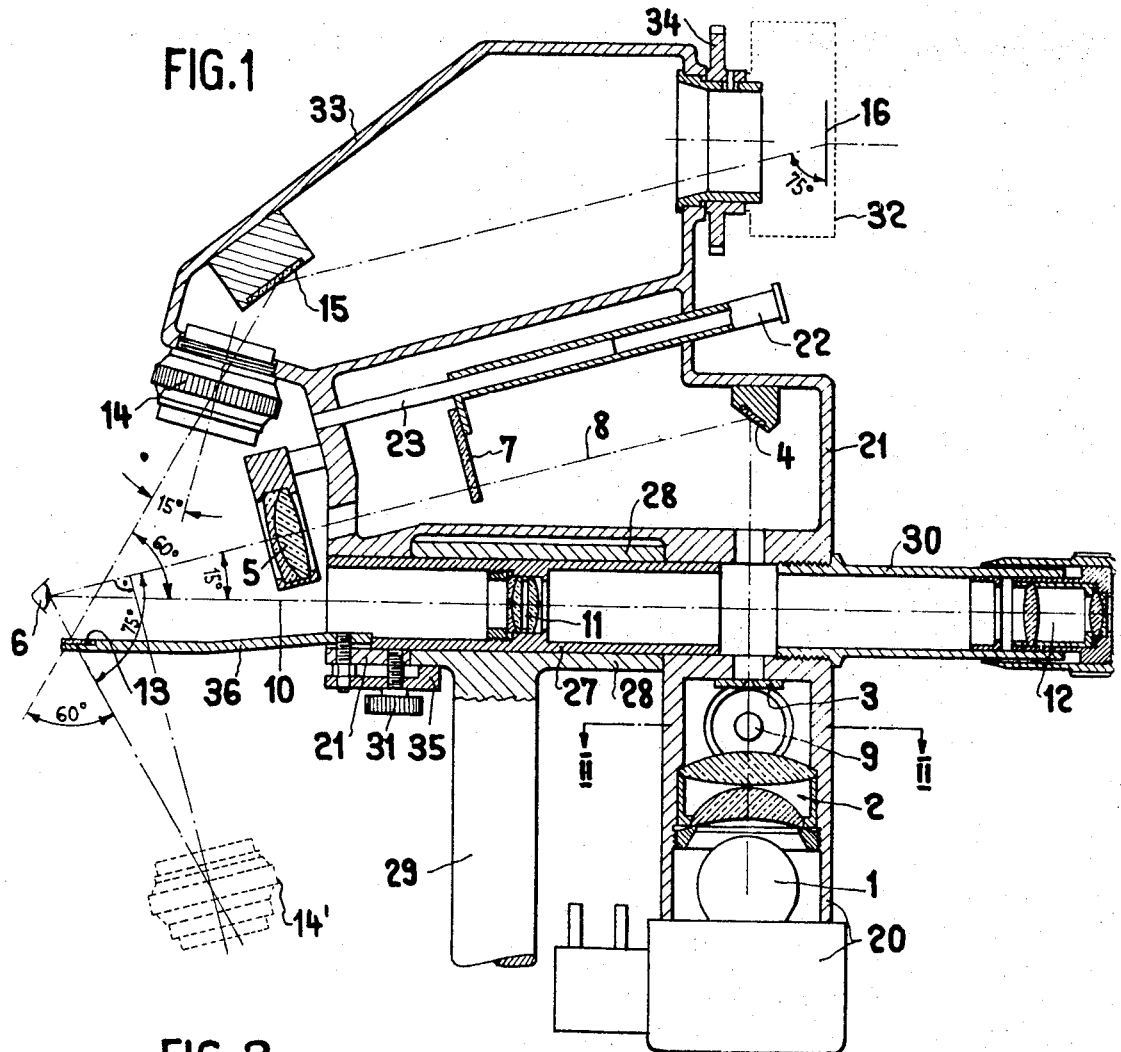

United States Patent [19]
Papritz

[11] 3,762,803
[45] Oct. 2, 1973

[54] OPHTHALMOLOGICAL APPARATUS WITH A SLIT ILLUMINATION FOR TAKING PHOTOGRAPHIC VIEWS OF THE EYE

[75] Inventor: Franz Papritz, Niederscherli, Switzerland

[73] Assignee: Haag-Street A.G., Liebefeld-Berne, Switzerland

[22] Filed: Mar. 10, 1972

[21] Appl. No.: 233,727

Related U.S. Application Data

[60] Continuation of Ser. No. 37,670, May 15, 1970, abandoned, which is a division of Ser. No. 599,851, Dec. 7, 1966, Pat. No. 3,519,338.

[30] Foreign Application Priority Data
Dec. 15, 1965 Switzerland .................... 17305/65

[52] U.S. Cl. .................... 351/7, 351/14, 351/16
[51] Int. Cl. .................... A61b 3/10, A61b 3/14
[58] Field of Search .................... 351/1, 7, 14, 16; 350/87; 95/11 E, 11 M

[56] References Cited
UNITED STATES PATENTS
3,519,338  7/1970  Papritz .................... 351/7

Primary Examiner—David Schonberg
Assistant Examiner—Paul A. Sacher
Attorney—Edward T. Connors

[57] ABSTRACT

A method and apparatus for analyzing the shape of the cornea of an eye, wherein narrow strips of the cornea surface are illuminated by a flat light beam and a picture of the illuminated profile of the illuminated profile of the cornea is taken by means of a camera of which the objective is perpendicular to the light beam, different profiles being taken by rotating said light beam and camera to different angular positions for succeeding exposures.

3 Claims, 2 Drawing Figures

OPHTHALMOLOGICAL APPARATUS WITH A SLIT ILLUMINATION FOR TAKING PHOTOGRAPHIC VIEWS OF THE EYE

The present application is a continuation of now abandoned application Ser. No. 37,670 filed May 15, 1970 which was a division of patent application Ser. No. 599,851 filed Dec. 7, 1966, now U.S. Pat. No. 3,519,338 issued July 7, 1970.

This invention relates to a method and apparatus for analyzing the shape of the cornea of an eye by repeatedly illuminating a narrow meridional strip of the cornea by means of a flat beam of light for illuminating a profile of the cornea and taking a photographic picture of the illuminated portion of the cornea in a direction perpendicular to said light beam, the plane of said flat light beam and the camera for taking said picture being rotated together into different meridional angular position between successive exposures for taking pictures of cornea profiles at various angles. From the photographically registered cornea profiles the shape of the cornea and particularly any irregularities of this shape may be analyzed subsequently without needing the patient, and contact lenses may be prepared based on the analysis of the recorded cornea profiles. Of course, the recorded profiles may be analyzed for any other purpose.

The apparatus for recording the cornea profiles broadly comprises a photographic camera having an objective and a film, illuminating means including a light source for continuous illumination and a flashlight source, a slit diaphragm for limiting the light falling from said light sources into the eye to a flat beam, optical means for observation of the eye having an axis passing through the eye, said camera, said illuminating means and said means for observation of the eye being rotatably mounted round said axis, an axis of incidence of the light beam into the eye, a fixing mark in this axis of incidence, the axis of said objective being optically perpendicular and said film being optically parallel to said axis of incidence of the light beam.

Figure 2:
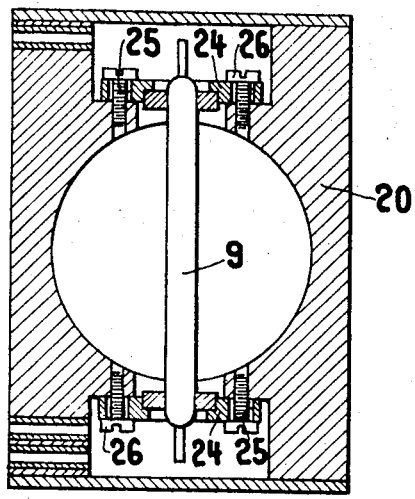

One embodiment of the apparatus according to this invention is illustrated by way of example in the attached drawing wherein FIG. 1 is a sectional view of the apparatus and FIG. 2 is a section along line II—II in FIG. 1 on a larger scale.

The apparatus has an incandescent lamp 1, a condenser 2, a slit diaphragm 3, a plane mirror 4 and a illumination lens 5, these parts serving for continuously projecting a flat light beam into an eye 6. The optical elements are accommodated in a casing having a portion 20 receiving the lamp 1, condenser 2 and slit diaphragm 3. A second portion 21 of the casing serves for accommodation of the mirror 4 and of a fixation mark 7 displaceable along the optical trace of the illuminating beam. The mark 7 is fixed on a tube 22 extending through an opening of casing portion 21 and guided on a bar 23.

A flash tube 9 is disposed between the condenser 2 and the slit diaphragm 3 in a position parallel to the longitudinal extension of the slit. A flat beam of flash light may be projected into the eye 6 from flash tube 9 through diaphragm 3, mirror 4 and lens 5. As shown in FIG. 2 the flash tube 9 is supported in discs 24 screwed to the structure of casing portion 20. The diameter of the holes 25 of discs 24 exceeds the diameter of the fixing screws 26 so that adjustment of the discs and of the flash tube supported therein in a direction transversal to the longitudinal extension of the flash tube and of the slit of the diaphragm 3 respectively is possible when screws 26 are loosened. It is thus possible to adjust the flash tube into a position optically symmetrical to the slit of the diaphragm and to the optical axis of the condenser and of the lamp 1, so that the trace of rays of the lamp illumination is not disturbed by any assymmetry of the flash tube.

The axis of the incident light beam includes an angle of 15° with the optical axis 10 of an optical observing system having an objective 11 and an ocular 12. The optical axis of this system is horizontal and passes through the eye 6.

The objective 11 of the observing system is accommodated in a tubular carrier 27 rotatably mounted in a sleeve 28 of a support 29. The support 29 is fixed on a table not shown in the drawing. The ocular of the observing system is accommodated in a tube 30 fixed in the casing. The casing portions 20 and 21 are fixed on the tubular carrier 27 and may be locked in determined angular positions by means of a bracket 35 engageable against the one rim portion of sleeve 28 by means of screw 31. When the screw 35 is loosened for disengaging bracket 35 from sleeve 28 the casing portions 20 and 21 may manually be rotated by seizing one of parts 20 or 21 together with tubular carrier 27 into any desired angular position, wherein parts 20, 21 and 27 may be locked again by means of bracket 35.

A support 36 is fixed at the fore end of carrier 27 in a bore of casing portion 21.

A plane mirror 13 fixed on support 36 is disposed in front of the eye and at the side of the observing axis 10. The illuminated portion of the cornea of the eye 6 may be photographically recorded on the film 16 of a schematically illustrated camera 32 fixed in an opening of a casing portion 33 by means of a clamping ring 34. The trace of rays into the camera passes from the cornea over mirror 13, an objective 14 and another mirror 15. As shown in the drawing the trace of the rays between the eye and the mirror 13 includes an angle of 75° with the axis 8 of the incident beam. Further, the objective 14 includes an angle of 15° with the trace of rays so that the axis of the objective 14 is optically perpendicular to the direction of incidence of the light beam. The plane mirror 15 is so arranged that the film 16 which is in a plane perpendicular to the axis of observation 10 for practical reasons, is optically parallel to the axis 8 of the incident light beam. The above facts may easily be verified by drawing the virtual positions of parts 14, 15 and 16 at the opposite side of the plane of mirror 13. The virtual position 14' of the objective is indicated in FIG. 1. The use of two mirrors 13 and 15 brings the further advantage that no reversal of the picture occurs.

Operation of the apparatus is as follows:

First the lamp 1 is switched on and the apparatus is so adjusted that the observation axis 10 is centered relatively to the eye 6. Afterwards the patient is instructed to look at the fixation mark 7, so that the eye is turned into the axis of incidence 8 of the light beam. In this case the flat light beam centrally enters into the eye and illuminates a great circle of the cornea. As soon as the continuously observed illumination of the eye is centered as required the shutter of the camera and the flash illumination are simultaneously actuated in a manner well known in the art, whereby a sharp image of one central section or profile of the cornea is obtained. The screw 31 is now loosened and the apparatus is rotated round its axis 10 into another angular position and is locked in the new position by means of screw 31 and bracket 35, whereafter another picture of a cornea section is made. In this manner a number of different sections or profiles of the cornea may be photographed and the exact form of the cornea may be determined from the series of pictures. The grinding of the contact surface of contact lenses may be based on the pictures thus obtained. Since the axis of the objective 14 is perpendicular to the direction of incidence of the light and the film 16 is parallel to this direction of incidence, no distortion or shortening of the pictures of the cornea profile occurs. Due to the inclination by 15° of the incident light beam relatively to the direction of observation a more favorable disposition of the trace of rays and of the optical elements between the eye and the camera is obtained. Under all circumstances the mirror 13 may sufficiently be approached to the face of the patient for forming a picture of the cornea without partial obstruction of the trace of rays.

Since the axis of the camera objective 14 is inclined by 15° to the trace of rays between the eye and the film, such that the eye is displaced from the center of the field of view of the objective and the point of intersection of the axis of the objective and of the axis of light incidence is outside the eye, the eye is seen by the camera under a favourable angle at which the full illuminated portion of the cornea is recorded without obstruction by portions of the patient's face.

As already mentioned, a picture on a reduced scale of the slit diaphragm 3 is produced in the eye, this allowing the use of a relatively long slit and of a correspondingly long flash tube so that a flash illumination of high intensity is obtained with simple and inexpensive means. On the other hand, the trace of rays of the continuous illumination by means of the lamp 1 is hardly influenced by the flash tube 9 and this tube may always be adjusted into a position for which the symmetry of the trace of rays of the continuous illumination is not disturbed.

All optical axes shown in FIG. 1 are in a common plane, this allowing a simple, handy and flat construction of the apparatus.

What I claim is:

1. An ophthalmological apparatus for taking photographic pictures of eye cornea profiles, said apparatus of the type including an optical system for observation of the eye and having an observation axis, a photographic camera for taking pictures of the eye, a light source, and a slit diaphragm in optical alignment with said light source for illumination of a narrow meridional strip of the cornea with a flat light beam, a structure for supporting a subassembly of said camera said light source and said slit diaphragm, bearing means allowing rotation of said structure around said observation axis, and means for locking said structure in predetermined angular position, said camera including an objective and a film, the plane of the film being optically parallel to and the axis of the objective being optically perpendicular to the axis of the light beam projected into the eye, the improvement wherein the construction is such that the axis of the objective intersects the axis of said light beam outside of the eye so that an angle is formed between the axis of said objective and the trace of rays of said meridional strip passing from the eye to the objective whereby the full illuminated portion of the cornea is recorded without obstruction by portions of the patient's face.

2. An apparatus according to claim 1, in which there is included a plane mirror positioned parallel to said observation axis and extending from said structure into the trace of rays between the eye and objective of the camera.

3. An apparatus according to claim 1, in which said optical system for observation of the eye is accommodated in a horizontal tubular carrier, the axis of the light beam falling into the eye being inclined relatively to the axis of said tubular carrier the trace of the rays between the eye and the camera including an acute angle with the axis of the incident light beam directed into the eye.

* * * * *